(12) United States Patent
Vazquez et al.

(10) Patent No.: US 12,694,502 B1
(45) Date of Patent: Jul. 28, 2026

(54) SYSTEM FOR INSPECTING AND ASSESSING THE CONDITION OF THE PAVEMENT OF A ROADWAY SEGMENT

(71) Applicant: AGUIA ANALITICA AVANZADA SL, Oleiros (ES)

(72) Inventors: Javier Joaquin Losada Vazquez, Madrid (ES); Juan Manuel Pan Veiga, Oleiros (ES)

( * ) Notice: Subject to any disclaimer, the term of this patent is extended or adjusted under 35 U.S.C. 154(b) by 0 days.

(21) Appl. No.: 19/390,595

(22) Filed: Nov. 16, 2025

(51) Int. Cl.
G06T 7/00 (2017.01)
G06T 7/11 (2017.01)
G06T 7/60 (2017.01)
G06T 17/05 (2011.01)

(52) U.S. Cl.
CPC .............. *G06T 7/0004* (2013.01); *G06T 7/11* (2017.01); *G06T 7/60* (2013.01); *G06T 17/05* (2013.01); *G06T 2207/10032* (2013.01)

(58) Field of Classification Search
CPC . G06T 7/0004; G06T 7/11; G06T 7/60; G06T 17/05; G06T 2207/10032
See application file for complete search history.

(56) References Cited

U.S. PATENT DOCUMENTS

2022/0242442 A1* 8/2022 Mcneely ............... B60W 50/14
2024/0167962 A1* 5/2024 Ramos .................. G06T 7/0004
2025/0043524 A1* 2/2025 Bishop .................. G06Q 10/20
2025/0095291 A1* 3/2025 Kusaki .................... G06T 17/00
2025/0217943 A1* 7/2025 Ponticelli ................. G06T 5/73
2026/0004138 A1* 1/2026 Han .......................... G06N 3/09

FOREIGN PATENT DOCUMENTS

CN 120013888 A * 5/2025 ............... G06N 3/08
WO WO-2022030255 A1 * 2/2022 ............. G09B 29/10

* cited by examiner

*Primary Examiner* — Chan S Park
*Assistant Examiner* — Daniel C Chang
(74) *Attorney, Agent, or Firm* — Ruben Alcoba, Esq.

(57) ABSTRACT

A system for inspecting and assessing the condition of the pavement of a roadway segment using at least one drone configured to capture image data of the pavement, operational data of the drone and its components, and environmental data. Image data portions comprising pixels corresponding to candidate pavement defects are extracted from the captured image data and independently processed by multiple AI-based computer-vision algorithms. Candidate pavement defects are confirmed based on concordant pavement defect detections generated by the algorithms. Pavement defects are geopositioned and measured, and a condition measure of the pavement (e.g., PCI) is determined. The at least one drone follows controlled flight trajectories to reduce or eliminate image quality deficiencies and cover the entire roadway segment with minimal passes without compromising the accuracy of the pavement condition assessment. The system is applicable to flexible and rigid pavements and enables mapping of the pavement defects within a GIS.

24 Claims, 11 Drawing Sheets

SYSTEM FOR INSPECTING AND ASSESSING THE CONDITION OF THE PAVEMENT OF A ROADWAY SEGMENT

BACKGROUND

The present invention relates generally to pavement inspection and condition assessment systems and, more particularly, to systems and methods employing drones and artificial-intelligence-based computer-vision techniques to detect, geoposition and measure pavement defects and to determine pavement condition indices.

Conventional pavement inspection and assessment techniques rely heavily on manual surveys or specialized terrestrial vehicles equipped with cameras, sensors, and positioning systems. While these terrestrial systems have been adopted by several agencies, they present inherent limitations including restricted reach, reduced operational flexibility, safety concerns associated with driving in live traffic environments, and limitations in image quality caused by oblique viewpoints, occlusions, and lane-level coverage constraints.

Attempts have been made to apply drones to pavement inspection. However, existing aerial-based solutions typically rely on limited or single-model computer-vision pipelines, are constrained by geospatial accuracy issues arising from insufficiently precise positioning and low-quality aeronautical imaging, require complex, multi-directional flight plans to produce orthophotos of sufficient precision, and/or are not adequate for the scale and cost requirements associated with roadway networks, especially when contrasted with airport runway inspection platforms. Existing airport aerial inspection technologies employ LiDAR or similar high-cost sensors and are therefore not scalable to roadway networks, which are orders of magnitude larger in total length and surface area.

Further, systems known in the art generally do not provide centimetric-level accuracy in the geopositioning or measurement of pavement defects using drone imagery alone, and they often fail to provide complete surface coverage with minimal flight passes. Existing approaches also fall short in delivering full GIS-based digital inventories of pavement defects and typically do not support both flexible and rigid pavement PCI workflows, each of which requires distinct sample-unit-based analytical pipelines.

Accordingly, there exists a need for an aerial-based pavement inspection and assessment system that provides: high-accuracy defect detection and geopositioning; reduced flight time and operational overhead; redundancy and robustness through multiple computer-vision model families; ability to operate without orthophoto generation or to use orthophoto-based precision as needed; and, full-network scalability and GIS output capability.

SUMMARY

The present invention provides a system and method for inspecting and assessing the condition of the pavement of a roadway segment using at least one drone comprising an imaging device, a high-accuracy geopositioning module using RTK technology, and one or more sensors for collecting operational and environmental data. The at least one drone captures image data of the roadway segment, which is processed by an AI-based computer-vision image processing unit configured to detect, geoposition, and measure pavement defects and to determine a pavement condition measure such as the PCI.

The system employs two complementary processes. In a first process, portions of the image data comprising candidate pavement defects are extracted and independently processed by multiple AI-based computer-vision algorithms belonging to different families. Each algorithm generates a pavement defect detection for each candidate pavement defect. The pavement defect detection is either positive or negative, that is, either corroborates the candidate pavement defect or disregards it. Candidate pavement defects are confirmed based on concordant pavement defect detections across algorithms, that is, a pavement defect is confirmed if a majority of algorithms generate a positive pavement defect detection for such pavement defect. Such consensus-based confirmation across algorithms from different families improves detection reliability, reducing the likelihood of false detections. Confirmed candidate pavement defects, which are treated as pavement defect, are georeferenced, measured, and a condition measure for the pavement of the roadway segment is determined. The first process preserves accuracy while enabling high-speed data acquisition without orthophoto generation. In a second process, an orthophoto with georeferenced pixels is generated; pavement defect detection and measurement are thereafter performed using portions of the orthophoto, providing enhanced precision where required.

The at least one drone follows planned flight trajectories, including two-pass bidirectional coverage of the roadway segment, with controlled altitude, speed and turning radii to minimize motion blur and ensure image quality. Turning radii related motion blur is due to excessive angular velocity, which has been proved to have a significant impact during the testing phase of the present invention and therefore needs to be controlled. This configuration enables inspection of the entire roadway segment with minimal flight passes while achieving centimetric (about 0.4 in or less) accuracy in the geopositioning and measurement of pavement defects.

The system further supports GIS integration, producing multiple digital map layers that include defect classifications, geometries, locations, and calculated condition indices. It is configured to analyze both flexible and rigid pavements, using distinct analytical hierarchies and workflows to accommodate slab-based characteristics in rigid pavement PCI determination.

Accordingly, the disclosed invention provides a scalable, safe, and cost-efficient drone-based pavement inspection and assessment system with enhanced accuracy, robustness, and data-rich output capabilities superior to existing terrestrial or aerial systems.

Definitions

As used herein, the term "drone" is interchangeable with "unmanned aerial vehicle (UAV)" and refers to an aircraft or flying device without a human pilot, crew, or passengers onboard that is remotely controlled or operates autonomously. The term "image data" refers to aerial image data obtained by the drone. "AI" refers to artificial intelligence. "PCI" refers to Pavement Condition Index, calculated in accordance with ASTM International Standard D6433, Standard Practice for Roads and Parking Lots Pavement Condition Index Surveys. "RTK" refers to real-time kinematic satellite positioning. "GIS" refers to geographic information system.

BRIEF DESCRIPTION OF THE DRAWINGS

These and other features, aspects, and advantages of the present invention will become better understood with regards to the following description, appended claims, and drawings where:

3

Figure 1:
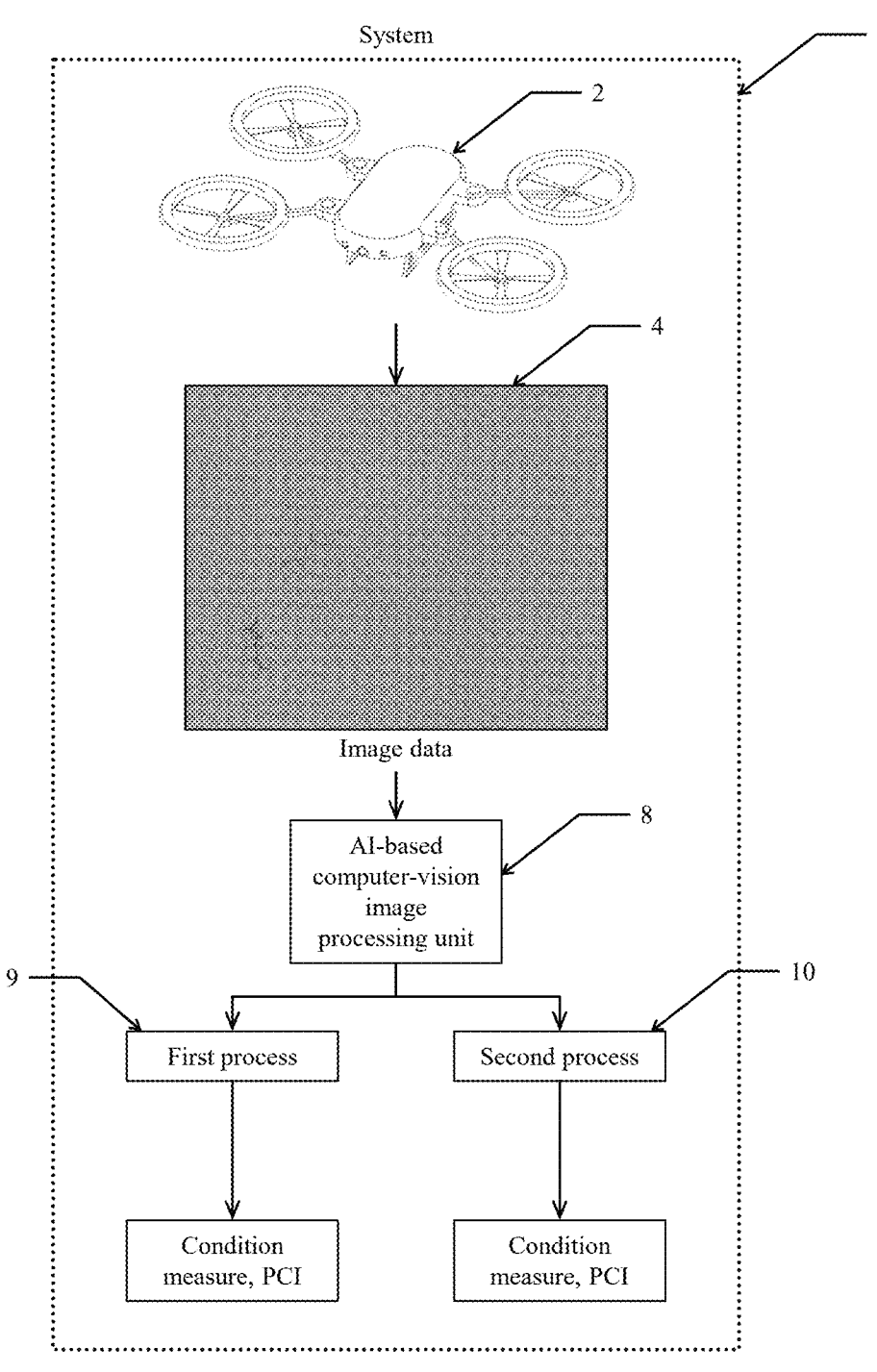
Figure 2:
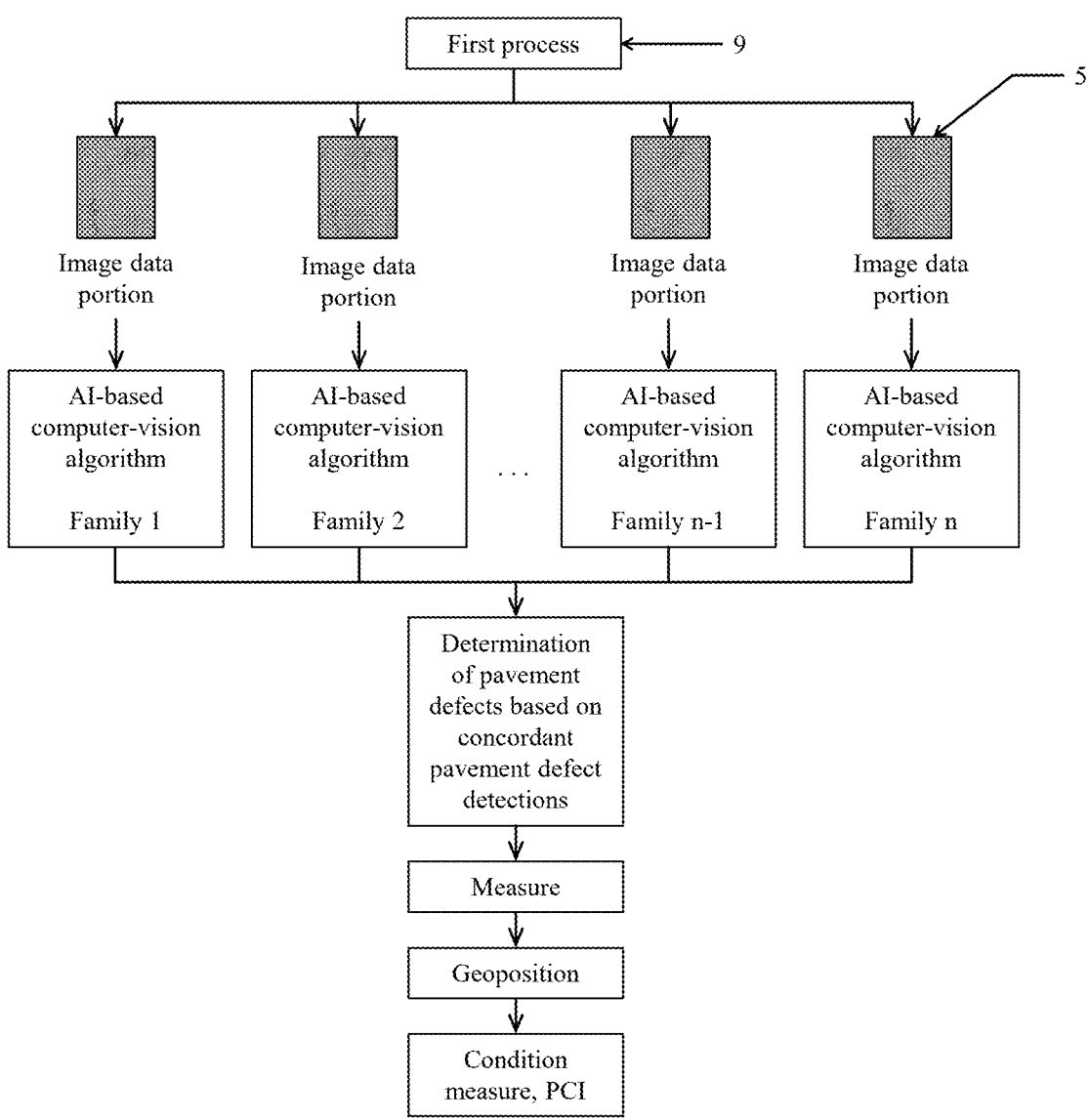
Figure 3:
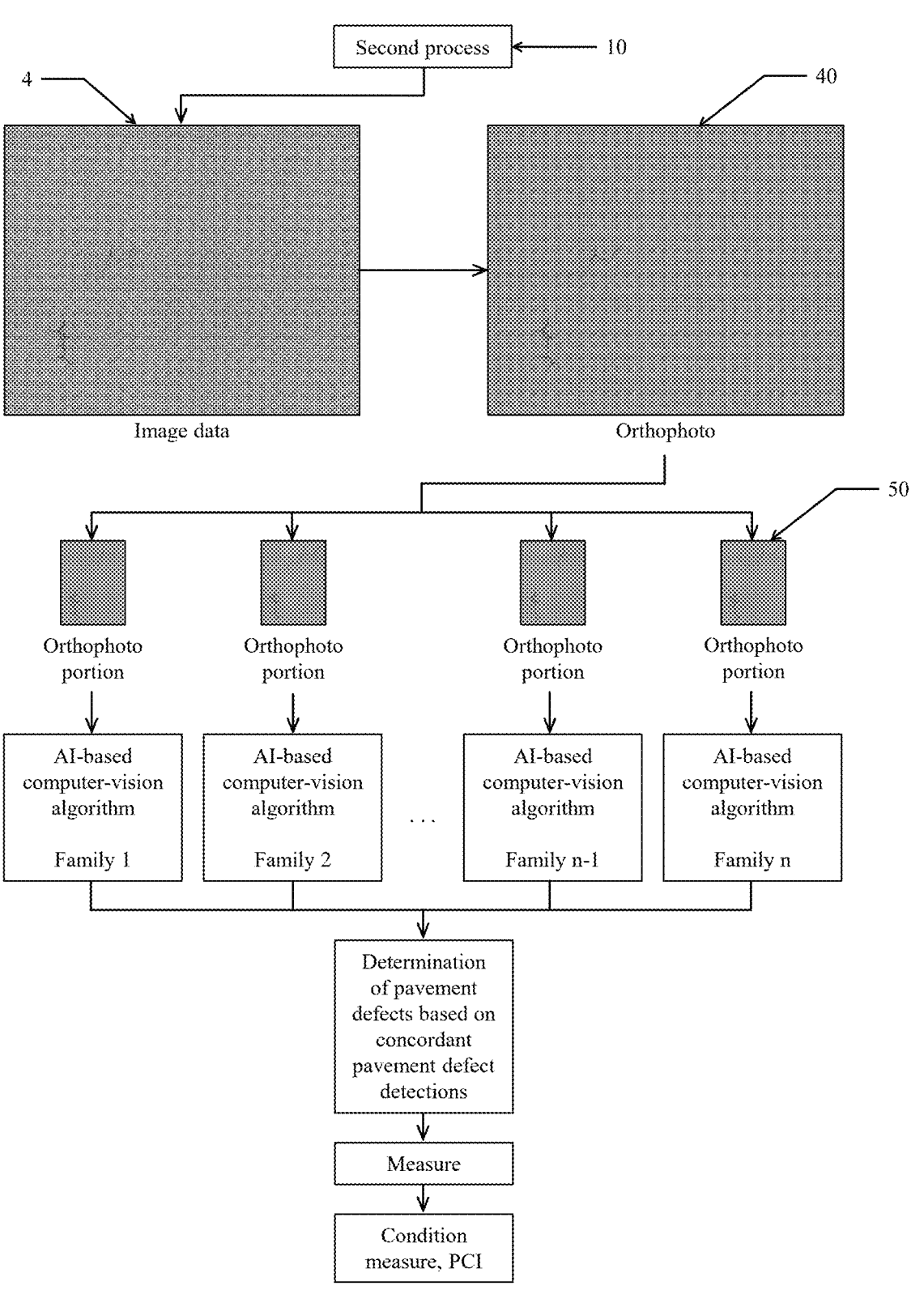
Figure 4:
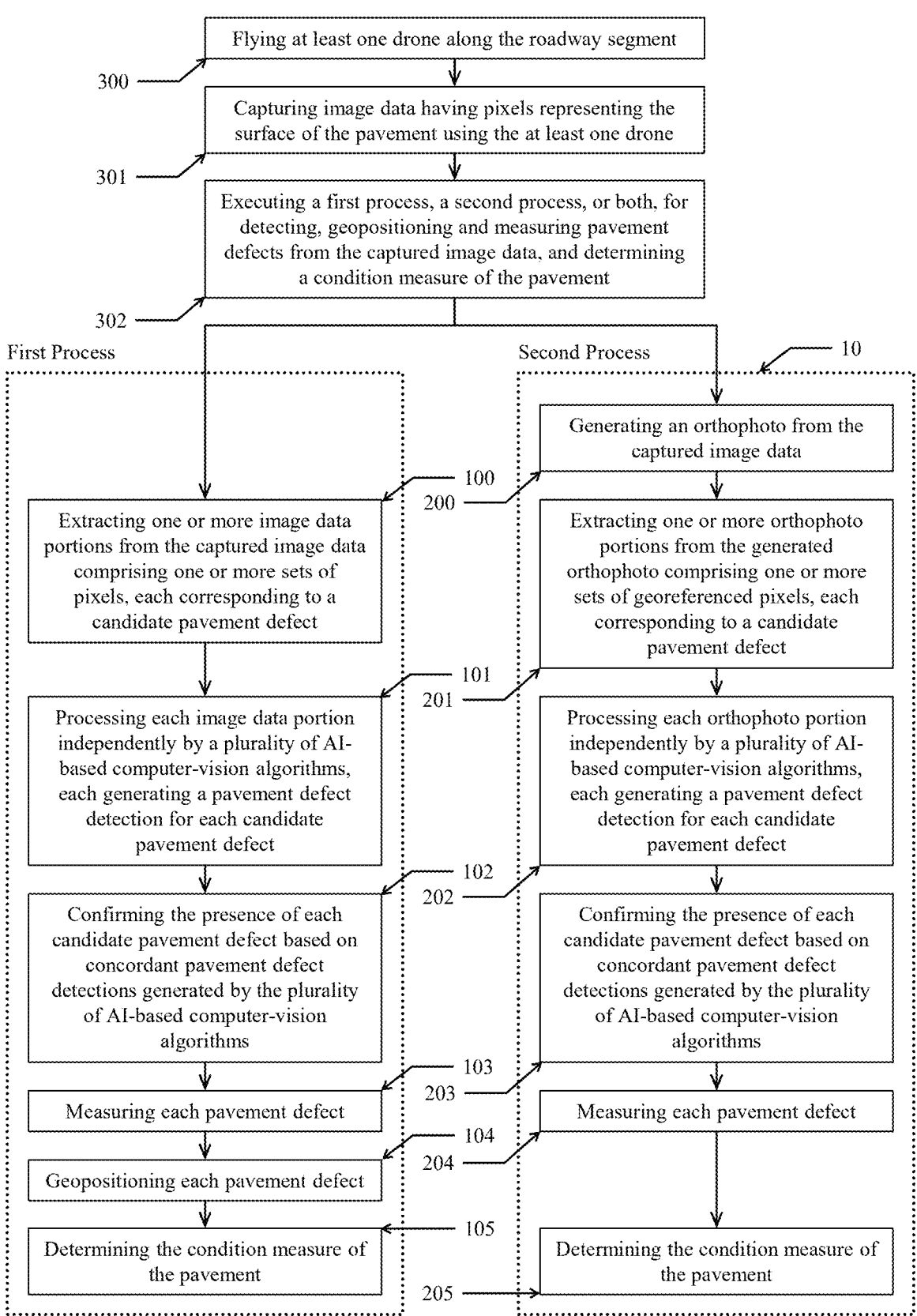
Figure 5:
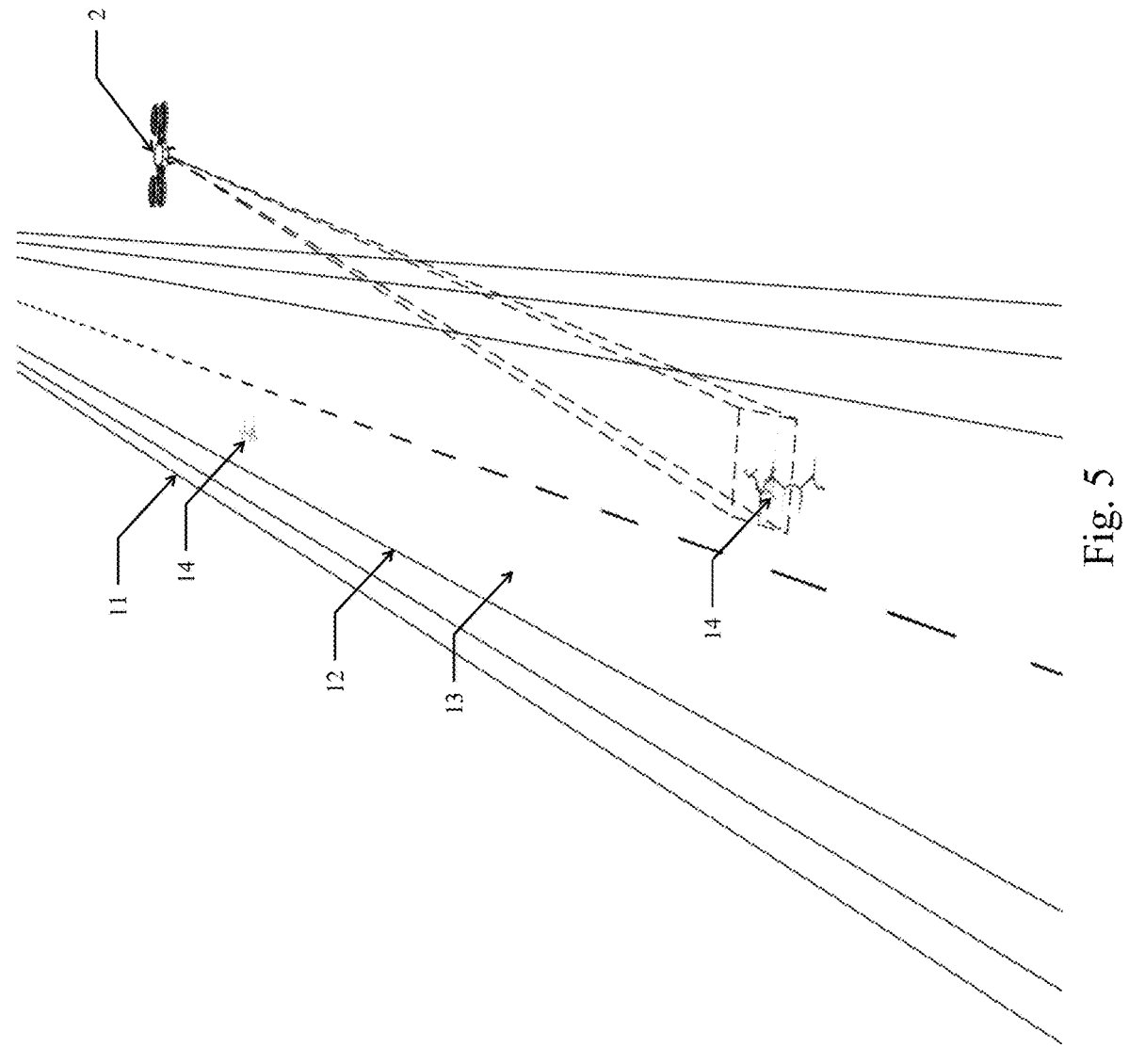
Figure 6:
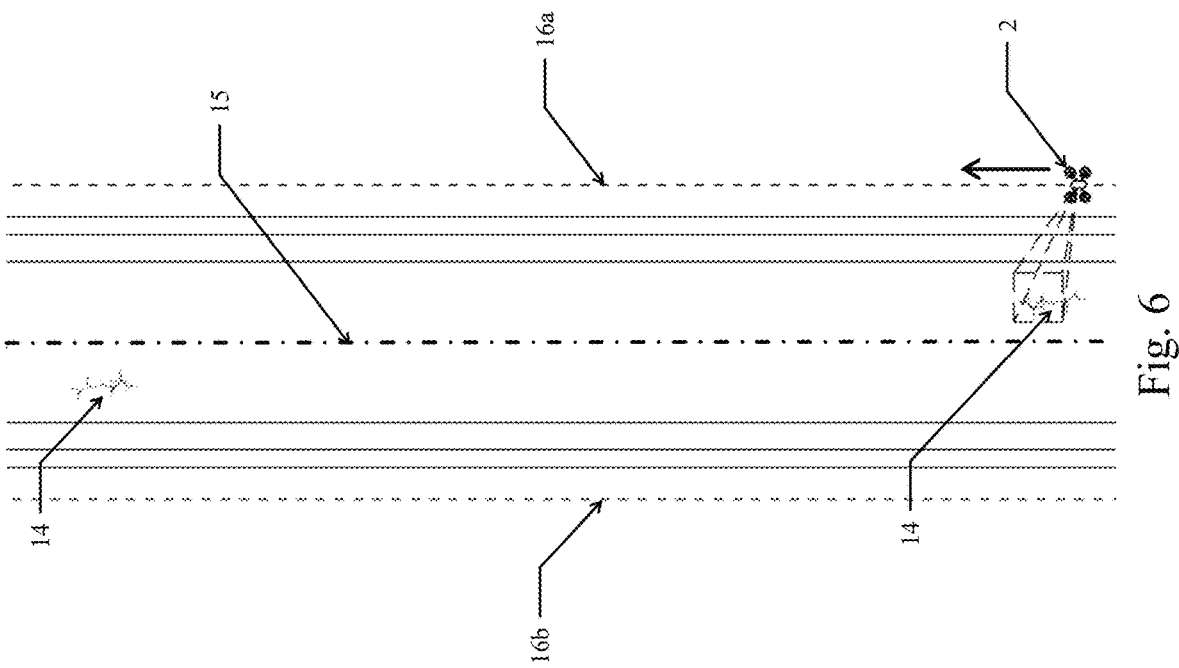
Figure 7:
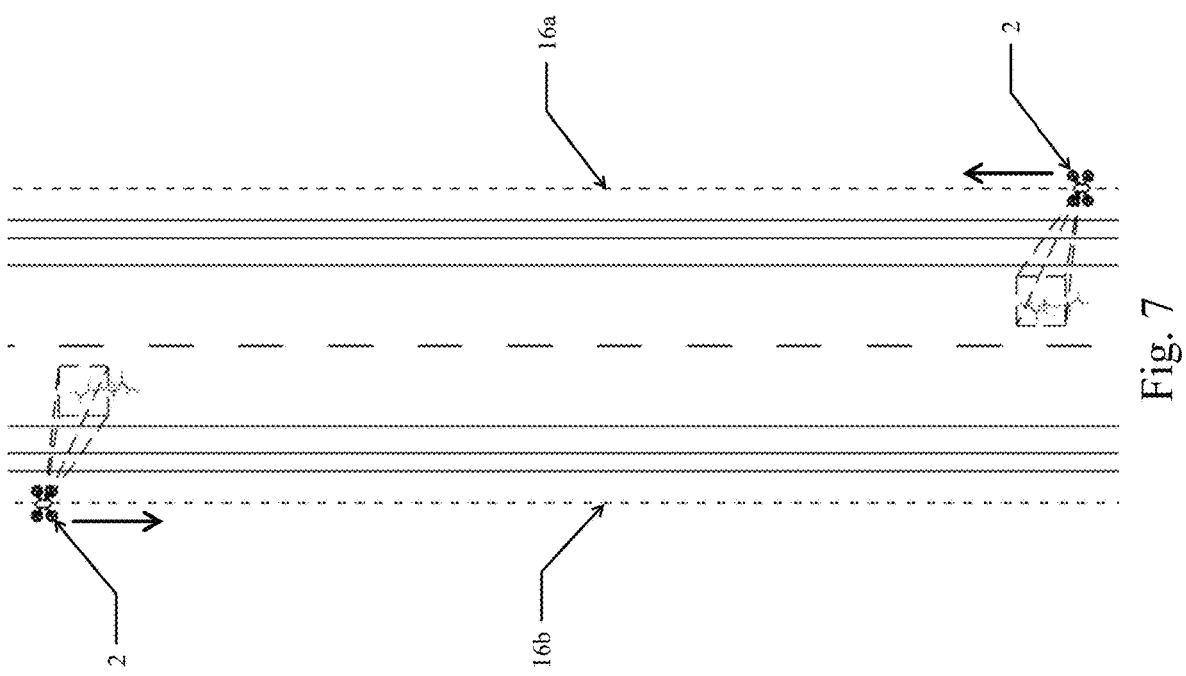
Figure 8:
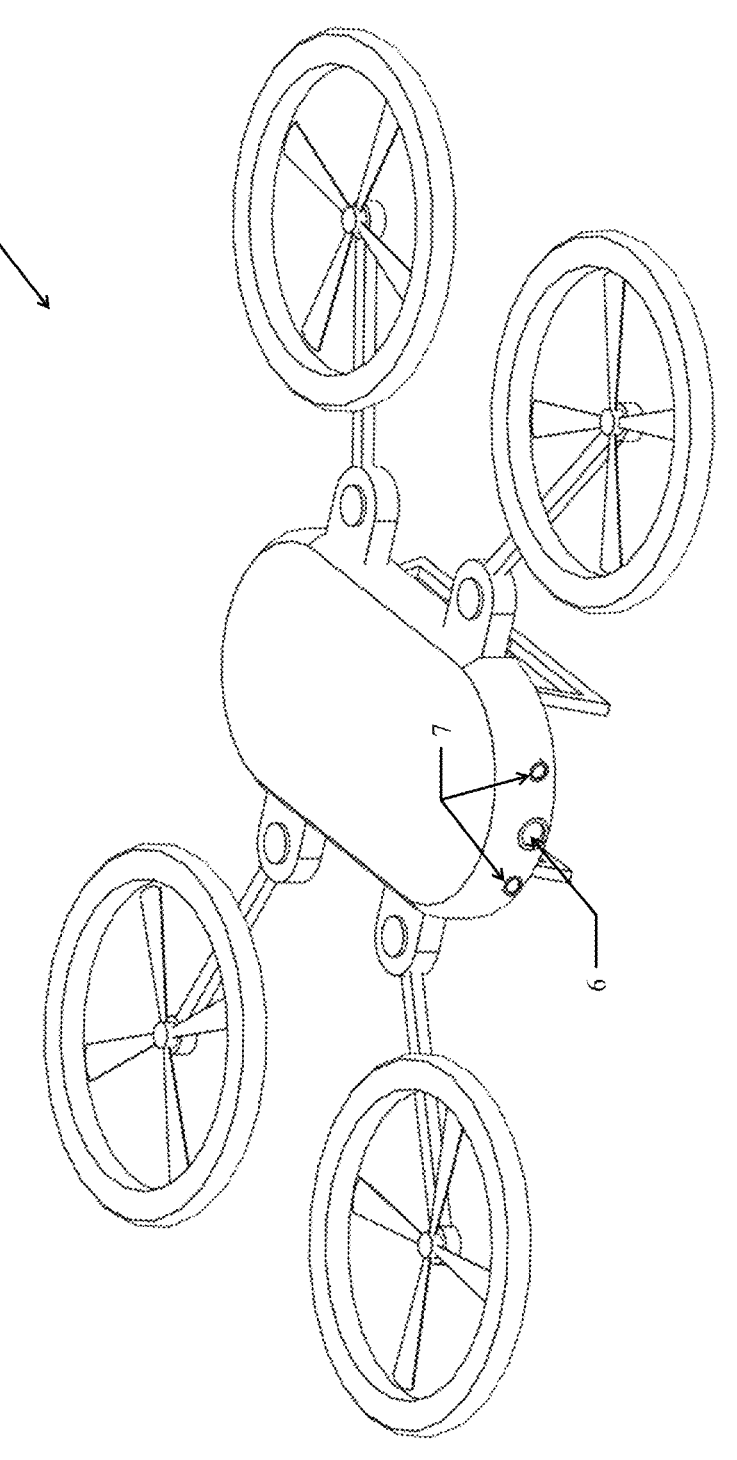
Figure 9:
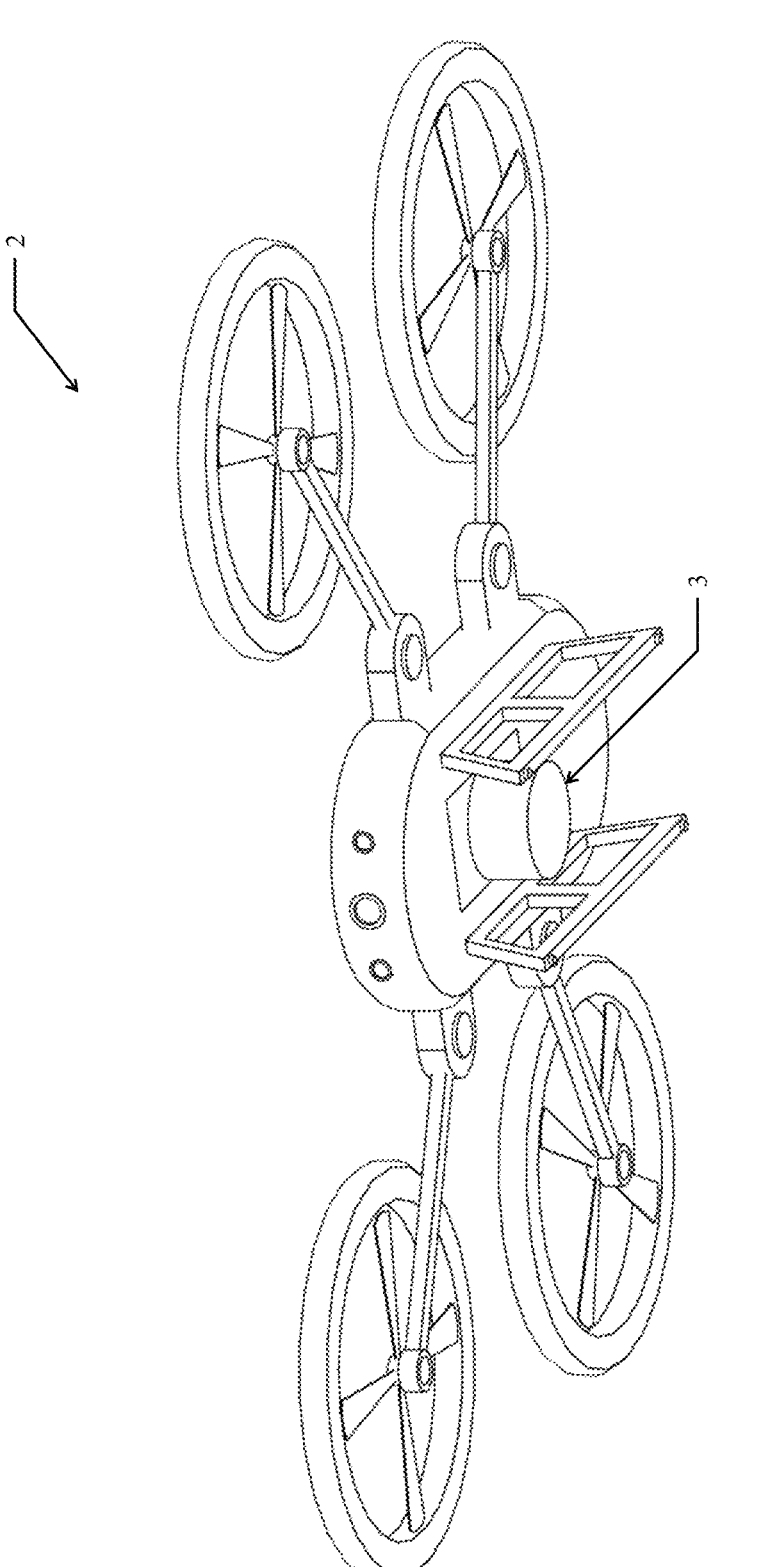
Figure 10:
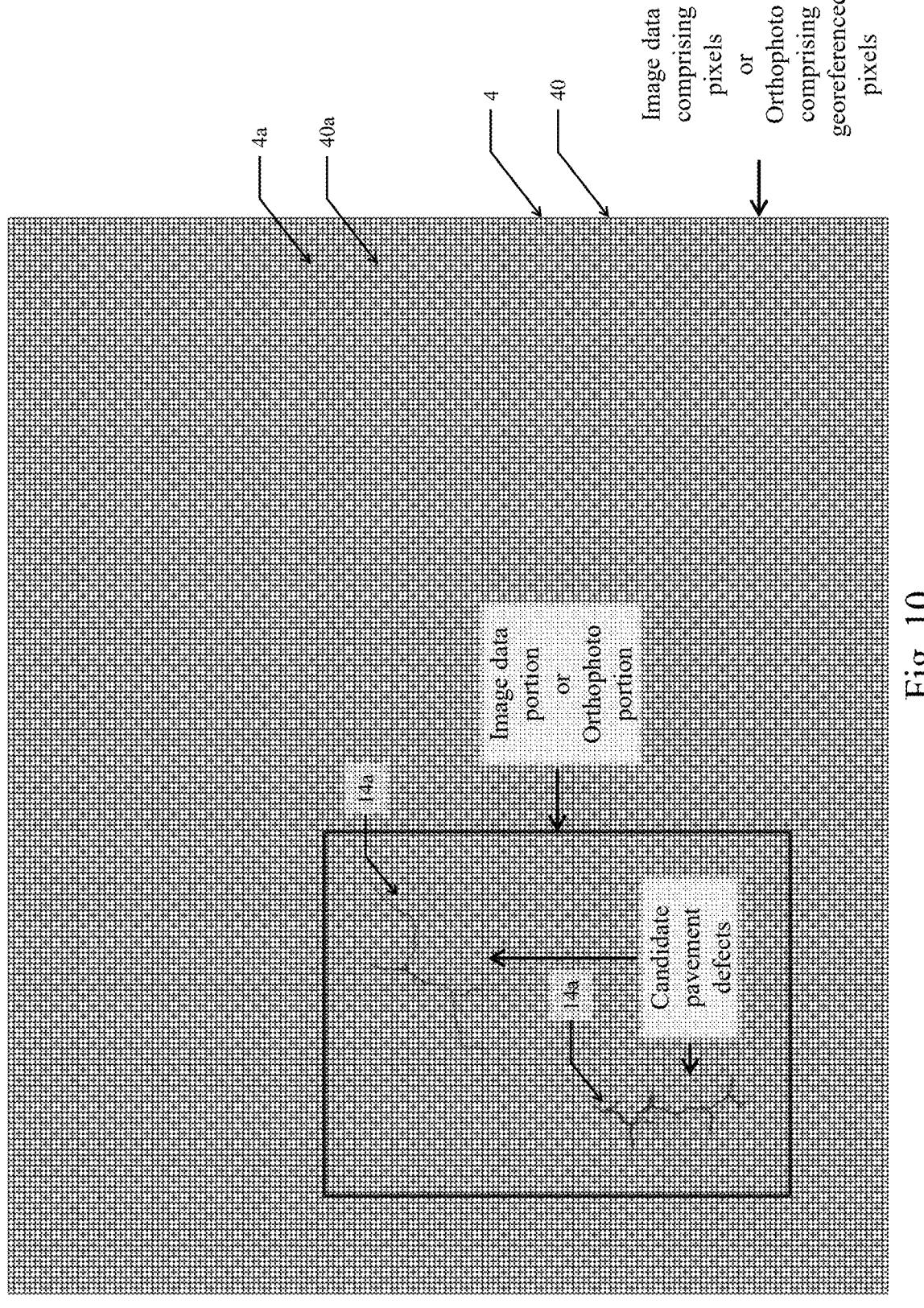

FIG. 1 is a chart describing the system;

FIG. 2 is a chart describing the first process;

FIG. 3 is a chart describing the second process;

FIG. 4 is a chart describing the method;

FIG. 5 is a perspective view of a roadway segment being inspected with at least one drone;

FIG. 6 is a plan view of a roadway segment being inspected with at least one drone;

FIG. 7 is a plan view of a roadway segment being inspected with two drones;

FIG. 8 is a top perspective view of the drone;

FIG. 9 is a bottom perspective view of the drone;

FIG. 10 is a representation of image data or an ortho-photo; and

Figure 11:
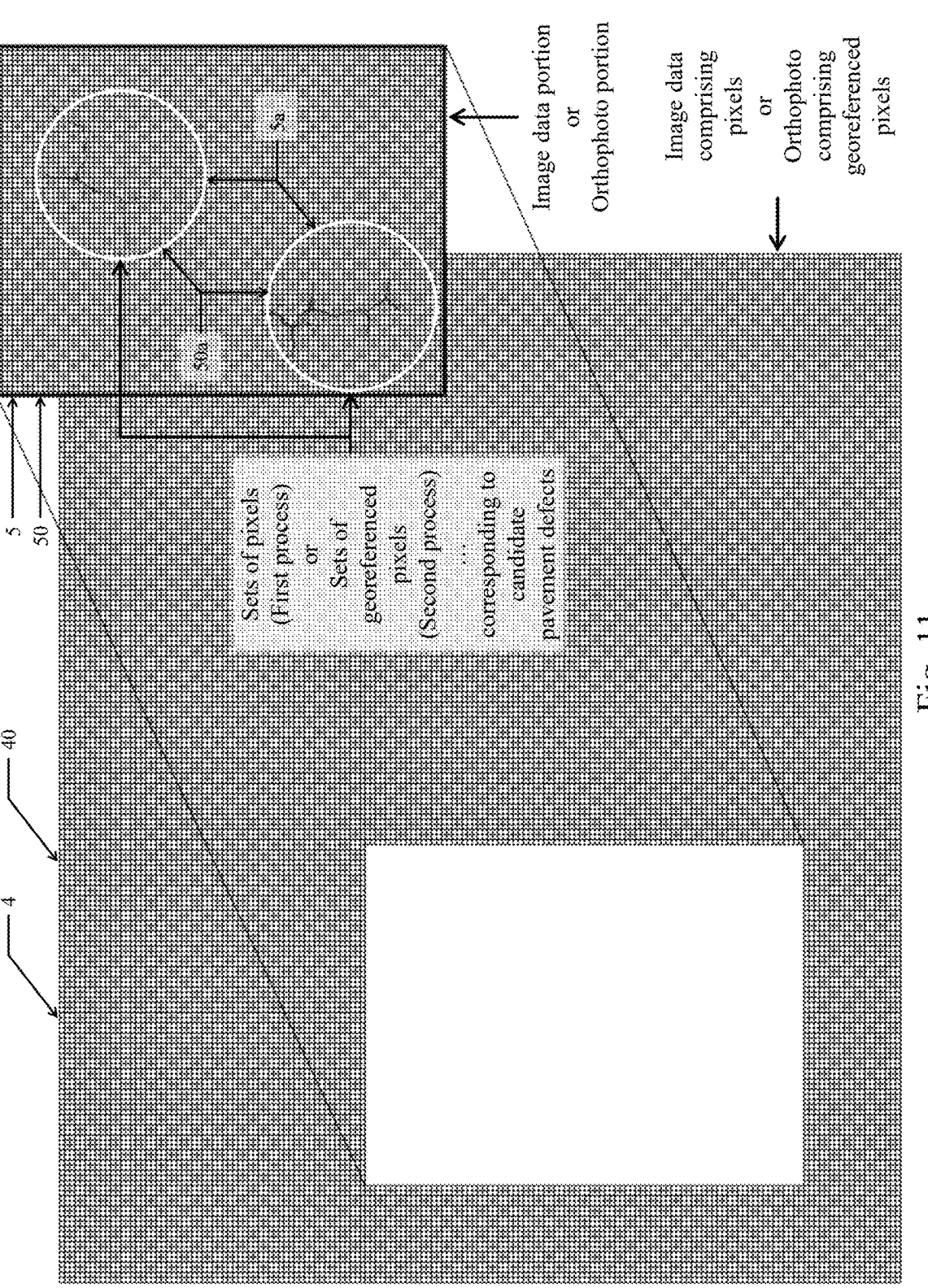

FIG. 11 is a representation of image data or an orthophoto, and corresponding portions.

DESCRIPTION

As seen in FIGS. 1-11, the present invention is a system and corresponding method 1 for inspecting and assessing the condition of the pavement 12 of a roadway segment 11.

The system 1 comprises at least one drone 2 that comprises an imaging device 3 configured to capture image data 4 having pixels 4a representing the surface 13 of the pavement 12, a geopositioning module 6 configured to determine geoposition data of the at least one drone 2, and one or more sensors 7 configured to acquire operational data of the at least one drone 2, operational data of the imaging device 3 or environmental data. And, an AI-based computer-vision image processing unit 8 configured to execute a first process 9, a second process 10, or both, for detecting, geopositioning and measuring pavement defects 14 from the captured image data 4, and determining a condition measure of the pavement 12. Wherein the imaging device 3, the geopositioning module 6, and the one or more sensors 7 are configured to operate simultaneously to enable correlation of the image data 4, the geoposition data of the at least one drone 2, and one or more of the operational data of the at least one drone 2, the operational data of the imaging device 3, and the environmental data, thereby enabling the georeferencing of the pixels 4a within the captured image data 4. Wherein the first process 9 comprises extracting one or more image data portions 5 from the captured image data 4, each image data portion 5 having less than the full spatial extent of the captured image data 4 and comprising one or more sets of pixels 5a, each corresponding to a candidate pavement defect 14a 100; processing each image data portion 5 independently by a plurality of AI-based computer-vision algorithms, each generating a pavement defect detection for each candidate pavement defect 14a 101; confirming the presence of each candidate pavement defect 14a based on concordant pavement defect detections generated by the plurality of AI-based computer-vision algorithms, wherein each confirmed candidate pavement defect 14a is treated by the system as a pavement defect 14 102; measuring each pavement defect 14 103; geopositioning each pavement defect 14 by georeferencing its respective set of pixels 5a 104; and determining the condition measure of the pavement 12 using the measured and geopositioned pavement defects 14 105. And, wherein the second process 10 comprises generating an orthophoto 40 from the captured image data 4, wherein the orthophoto 40 has georeferenced pixels 40a representing the surface 13 of the pavement 12 200; extracting one or more orthophoto portions 50 from the generated orthophoto 40, each orthophoto portion 50 having less than the full spatial extent of the generated orthophoto 40 and comprising one or more sets of georeferenced pixels 50a, each corresponding to a candidate pavement defect 14a 201; processing each orthophoto portion 50 independently by a plurality of AI-based computer-vision algorithms, each generating a pavement defect detection for each candidate pavement defect 14a 202; confirming the presence of each candidate pavement defect 14a based on concordant pavement defect detections generated by the plurality of AI-based computer-vision algorithms, wherein each confirmed candidate pavement defect 14a is treated by the system as a pavement defect 14, which is already geopositioned by its respective set of georeferenced pixels 50a 203; measuring each pavement defect 14 204; and determining the condition measure of the pavement 12 using the measured and geopositioned pavement defects 14 205.

Accordingly, the method corresponding to the system 1 above comprises flying the at least one drone 2 along the roadway segment 11 300; capturing image data 4 having pixels 4a representing the surface 13 of the pavement 12 using the at least one drone 2 301; and executing the first process 9, the second process 10, or both, for detecting, geopositioning and measuring pavement defects 14 from the captured image data 4, and determining a condition measure of the pavement 12 302.

In an embodiment of the present invention, the at least one drone 2 follows only two flight trajectories, each flown once, a first 16a extending along the entire roadway segment 11 in one direction and a second 16b extending along the entire roadway segment 11 in the opposite direction.

In another embodiment of the present invention, the two flight trajectories 16a 16b extend on opposite sides of a centerline 15 of the roadway segment 11.

In another embodiment of the present invention, the geopositioning and measurement of the pavement defects 14 are performed with an accuracy of about 0.4 inches or less, and wherein the condition measure is the PCI.

In another embodiment of the present invention, the entire surface 13 of the pavement 12 of the roadway segment 11 is inspected and its condition assessed, thereby providing a substantially 100% confidence level of the determined PCI.

In another embodiment of the present invention, the at least one drone 2 is configured to follow flight trajectories having controlled altitude, speed and turning radii to reduce or eliminate motion blur in the captured image data 4.

In another embodiment of the present invention, the plurality of AI-based computer-vision algorithms comprises algorithms belonging to different families of AI-based computer-vision algorithms to reduce the likelihood of false pavement defect detections.

In another embodiment of the present invention, the geopositioning module 6 uses RTK satellite data to determine the geoposition data of the at least one drone 2.

In another embodiment of the present invention, the roadway segment 11 comprises flexible pavement, rigid pavement, or a combination thereof, and the condition measure is determined separately for each pavement type.

In yet another embodiment of the present invention, the system 1 provides a substantially complete inventory of the measured and geopositioned pavement defects 14 as part of a GIS map layer.

An advantage of the present invention is the versatility to address varying market needs or assessment scopes by providing two complementary processes for detecting, geo-positioning, and measuring pavement defects. The first process operates without generating an orthophoto and still achieves precision superior to competing aerial-imagery-based solutions. This first process enables faster flights, lower data volumes, and shorter processing times, making it particularly beneficial for large roadway segments or entire roadway networks. The second process generates an ortho-photo and delivers high-precision results, but requires slower flights, greater image overlap, and increased post-processing, making it ideal for shorter roadway segments where maximum precision is required. A user may perform a broad assessment of a large roadway segment or network using the first process, prioritize sections, and then apply the second process on selected sections to obtain higher-detail results.

Another advantage of the present invention is controlled cost that enables scalability. Competing systems typically rely on drones equipped with LiDAR and other advanced sensors designed for airport runway inspection. Such systems are significantly more expensive and not economically scalable to roadways, whose total surface coverage is orders of magnitude greater than airport environments. The present invention instead utilizes a more cost-effective imaging-focused approach that retains high accuracy while remaining financially practical for large-scale roadway inspection.

Another advantage of the present invention is enhanced flexibility, accuracy, and safety without compromising economic feasibility. Existing inspection systems using terrestrial-vehicle mounted technology may offer cost advantages, but suffer from limited reach, lower image quality due to low or oblique camera angles, and operational safety constraints associated with performing the inspections along live traffic lanes. In contrast, the disclosed drone-based system captures nadir or near-nadir imagery across the entire roadway width, enabling superior defect detection, geopositioning, and measurement accuracy. It also eliminates the need for ground personnel to operate in traffic-exposed environments, significantly improving safety. Established UAV flight standards further minimize risks associated with operations above roadways, making the approach both efficient and safe.

Another advantage of the present invention is improved reliability and robustness through the use of multiple AI-based algorithms belonging to different families. Each algorithm contributes independent detection results, and the system confirms pavement defects only when concordant detections are present. Weaknesses of a given algorithm are therefore mitigated by the strengths of others, providing enhanced confidence and reducing the likelihood of false detections. This multi-algorithm confirmation framework yields a more accurate and dependable defect identification process than any single-algorithm approach.

Another advantage of the present invention is increased image-processing efficiency. The system extracts localized image portions containing pixels indicative of candidate pavement defects, significantly smaller in spatial extent than the original images, and feeds these focused data portions to the AI-based algorithms. These image subsets represent richer input data for defect-focused analysis, improving algorithm performance and reducing computational load.

Another advantage of the present invention is streamlined drone flight operations that enhance scalability and overall system performance. The system can generate high-quality orthophotos using only two longitudinal passes along the roadway segment, without requiring perpendicular grid-pattern flights, even on multi-lane facilities. This procedural innovation eliminates the need for wide transverse flight paths that are necessary to prevent motion-blur issues associated with tight turns and high angular velocities. Controlled turning radii and alignment along the roadway centerline further minimize image distortion. In addition, the system can capture imagery from outside the active travel lanes, virtually eliminating risks associated with operating above live traffic.

Another advantage of the present invention is improved functionality through enhanced GIS-based output. While existing solutions typically produce a single GIS layer showing condition indices such as PCI, the disclosed system can generate multiple detailed GIS layers, including but not limited to PCI scores, defect classifications, geometries, dimensions, and georeferenced defect inventories. This level of detailed and structured spatial reporting is unique and provides superior utility for pavement management and maintenance planning.

Another advantage of the present invention is the ability to achieve substantially complete coverage of the entire roadway surface while maintaining high measurement accuracy. The use of drones provides superior flexibility and reach compared to terrestrial systems, enabling inspection over the full width and length of roadway segments, including shoulders and auxiliary lanes, without the limitations imposed by terrestrial-vehicle-mounted platforms that are confined to traffic lanes. This capability allows the system to deliver a substantially 100% confidence level in the determined pavement condition index, typically the PCI, as the full pavement surface is inspected rather than sampled or partially observed. Furthermore, the aerial perspective allows acquisition of nadir or near-nadir imagery, which is critical for achieving centimetric (approximately 0.4 inches or less) accuracy in the geopositioning and measurement of pavement defects. Such accuracy is necessary to ensure accurate condition assessment results and is generally not achievable by terrestrial imaging systems operating from oblique angles or constrained vantage points.

Still another advantage of the present invention is its adaptability to both flexible and rigid pavement structures. While PCI calculation principles apply to both pavement types, defect definitions and processing workflows differ significantly. In flexible pavements, defects can be classified without prior structural context. In rigid pavements, many defect types require slab-level identification, necessitating knowledge of slab boundaries and layout. Accordingly, the system employs different hierarchical processing pipelines for flexible (branch-section-sample unit-defect) and rigid (branch-section-sample unit-slab-defect) pavements, and utilizes pavement-type-specific AI training datasets. This dual-capability design enables accurate condition assessment across diverse pavement systems and is unique within the industry.

The embodiments of the system for inspecting and assessing the condition of the pavement of a roadway segment herein are exemplary and numerous modifications, combinations, variations, and rearrangements can be readily envisioned to achieve an equivalent result, all of which are intended to be embraced within the scope of the appended claims. Further, nothing in the above-provided discussions of the system for inspecting and assessing the condition of the pavement of a roadway segment should be construed as limiting the invention to an embodiment or a combination of embodiments. The scope of the invention is defined by the description, drawings, and claims.

What is claimed is:

1. A system for inspecting and assessing a condition of a pavement of a roadway segment, the system comprises:

at least one drone that comprises an imaging device configured to capture image data having pixels representing a surface of the pavement, a geopositioning module configured to determine geoposition data of the at least one drone, and one or more sensors configured to acquire operational data of the at least one drone, operational data of the imaging device or environmental data; and an AI-based computer-vision image processing unit configured to execute a first process and a second process for detecting, geopositioning and measuring pavement defects from the captured image data, and determining a condition measure of the pavement;

wherein the imaging device, the geopositioning module, and the one or more sensors are configured to operate simultaneously to enable correlation of the image data, the geoposition data of the at least one drone, and one or more of the operational data of the at least one drone, the operational data of the imaging device, and the environmental data, thereby enabling a georeferencing of the pixels within the captured image data;

wherein the first process comprises extracting one or more image data portions from the captured image data through a first screening process, each image data portion having less than a full spatial extent of the captured image data and comprising one or more sets of pixels, each corresponding to a candidate pavement defect; independently processing each image data portion independently by a first plurality of AI-based computer-vision algorithms, wherein each AI-based computer-vision algorithm of the first plurality of AI-based computer-vision algorithms treats each image data portion as a separate input and generates each generating a pavement defect detection for each candidate pavement defect; confirming a presence of each candidate pavement defect based on concordant pavement defect detections generated by the first plurality of AI-based computer-vision algorithms, wherein each confirmed candidate pavement defect is treated by the system as a pavement defect; measuring each pavement defect; geopositioning each pavement defect by georeferencing its respective set of pixels; and determining the condition measure of the pavement using the measured and geopositioned pavement defects; and wherein the second process comprises generating an orthophoto from the captured image data, wherein the orthophoto has georeferenced pixels representing the surface of the pavement; extracting one or more orthophoto portions from the generated orthophoto through a second screening process, each orthophoto portion having less than the full spatial extent of the generated orthophoto and comprising one or more sets of georeferenced pixels, each corresponding to a candidate pavement defect; independently processing each orthophoto portion independently by a second plurality of AI-based computer-vision algorithms, wherein each AI-based computer-vision algorithm of the second plurality of AI-based computer-vision algorithms treats each orthophoto portion as a separate input and generates a pavement defect detection for each candidate pavement defect; confirming the presence of each candidate pavement defect based on concordant pavement defect detections generated by the second plurality of AI-based computer-vision algorithms, wherein each confirmed candidate pavement defect is treated by the system as a pavement defect, which is already geopositioned by its respective set of georeferenced pixels; measuring each pavement defect; and determining the condition measure of the pavement using the measured and geopositioned pavement defects.

2. The system of claim 1, wherein the at least one drone follows only two flight trajectories, each flown once, a first extending along the entire roadway segment in one A direction and a second extending along the entire roadway segment in an opposite direction.

3. The system of claim 2, wherein the two flight trajectories extend on opposite sides of a centerline of the roadway segment.

4. The system of claim 1, wherein the geopositioning and measurement of the pavement defects are performed with an accuracy of about 0.4 inches or less, and wherein the condition measure is a PCI.

5. The system of claim 4, wherein the surface of the pavement of the roadway segment is inspected in its entirety and its condition assessed, such that the PCI is based on a complete inspection rather than a statistical sampling.

6. The system of claim 1, wherein the at least one drone is configured to follow flight trajectories having controlled altitude, speed and turning radii to reduce or eliminate motion blur in the captured image data.

7. The system of claim 1, wherein the first and second pluralities of AI-based computer-vision algorithms comprises algorithms belonging to different families of AI-based computer-vision algorithms.

8. The system of claim 1, wherein the geopositioning module uses RTK satellite data to determine the geoposition data of the at least one drone.

9. The system of claim 1, wherein the roadway segment comprises flexible pavement, rigid pavement, or a combination thereof, and the condition measure is determined separately for each pavement type.

10. The system of claim 1, wherein the system provides an inventory of the measured and geopositioned pavement defects as part of a GIS map layer.

11. A method for inspecting and assessing a condition of a pavement of a roadway segment, the method comprises:

flying at least one drone along the roadway segment;

capturing image data having pixels representing a surface of the pavement using the at least one drone; and executing a first process and a second process for detecting, geopositioning and measuring pavement defects from the captured image data, and determining a condition measure of the pavement;

wherein the first process comprises extracting one or more image data portions from the captured image data through a first screening process, each image data portion having less than a full spatial extent of the captured image data and comprising one or more sets of pixels, each corresponding to a candidate pavement defect; independently processing each image data portion independently by a first plurality of AI-based computer-vision algorithms, wherein each AI-based computer-vision algorithm of the first plurality of AI-based computer-vision algorithms treats each image data portion as a separate input and generates a pavement defect detection for each candidate pavement defect; confirming a presence of each candidate pavement defect based on concordant pavement defect detections generated by the first plurality of AI-based computer-vision algorithms, wherein each confirmed candidate pavement defect is treated as a pavement defect; measuring each pavement defect; geopositioning each pavement defect by georeferencing its respective set of pixels based on geoposition data of the at least one drone; and determining the condition measure of the pavement using the measured and geopositioned pavement defects; and wherein the second process comprises generating an orthophoto from the captured image data using geoposition data of the at least one drone, wherein the orthophoto has georeferenced pixels representing the surface of the pavement; extracting one or more orthophoto portions from the generated orthophoto through a second screening process, each orthophoto portion having less than the full spatial extent of the generated orthophoto and comprising one or more sets of georeferenced pixels, each corresponding to a candidate pavement defect; processing each orthophoto portion independently by a second plurality of AI-based computer-vision algorithms, wherein each AI-based computer-vision algorithm of the second plurality of AI-based computer-vision algorithms treats each orthophoto portion as a separate input and generates a pavement defect detection for each candidate pavement defect; confirming the presence of each candidate pavement defect based on concordant pavement defect detections generated by the second plurality of AI-based computer-vision algorithms, wherein each confirmed candidate pavement defect is treated as a pavement defect, which is already geopositioned by its respective set of georeferenced pixels; measuring each pavement defect; and determining the condition measure of the pavement using the measured and geopositioned pavement defects.

12. The method of claim 11, wherein the at least one drone follows only two flight trajectories, each flown once, a first extending along the entire roadway segment in one direction and a second extending along the entire roadway segment in an opposite direction.

13. The method of claim 12, wherein the two flight trajectories extend on opposite sides of a centerline of the roadway segment.

14. The method of claim 11, wherein the geopositioning and measurement of the pavement defects are performed with an accuracy of about 0.4 inches or less, and wherein the condition measure is a PCI.

15. The method of claim 14, wherein the surface of the pavement of the roadway segment is inspected in its entirety and its condition assessed, such that the PCI is based on a complete inspection rather than a statistical sampling.

16. The method of claim 11, wherein the at least one drone is configured to follow flight trajectories having controlled altitude, speed and turning radii to reduce or eliminate motion blur in the captured image data.

17. The method of claim 11, wherein the first and second pluralities of AI-based computer-vision algorithms comprises algorithms belonging to different families of AI-based computer-vision algorithms.

18. The method of claim 11, wherein RTK satellite data is used to determine the geoposition data of the at least one drone.

19. The method of claim 11, wherein the roadway segment comprises flexible pavement, rigid pavement, or a combination thereof, and the condition measure is determined separately for each pavement type.

20. The method of claim 11, wherein the system provides an inventory of the measured and geopositioned pavement defects as part of a GIS map layer.

21. A system for inspecting and assessing a condition of a pavement of a roadway segment, the system comprises:
    at least one drone that comprises an imaging device configured to capture image data having pixels representing a surface of the pavement, a geopositioning module configured to determine geoposition data of the at least one drone, and one or more sensors configured to acquire operational data of the at least one drone, operational data of the imaging device or environmental data; and
an AI-based computer-vision image processing unit configured to execute a process for detecting, geopositioning and measuring pavement defects from the captured image data, and determining a condition measure of the pavement;
wherein the imaging device, the geopositioning module, and the one or more sensors are configured to operate simultaneously to enable correlation of the image data, the geoposition data of the at least one drone, and one or more of the operational data of the at least one drone, the operational data of the imaging device, and the environmental data, thereby enabling a georeferencing of the pixels within the captured image data; and
wherein the process comprises extracting one or more image data portions from the captured image data through a screening process, each image data portion having less than a full spatial extent of the captured image data and comprising one or more sets of pixels, each corresponding to a candidate pavement defect; independently processing each image data portion by a plurality of AI-based computer-vision algorithms, wherein each AI-based computer-vision algorithm of the plurality of AI-based computer-vision algorithms treats each image data portion as a separate input and generates a pavement defect detection for each candidate pavement defect; confirming a presence of each candidate pavement defect based on concordant pavement defect detections generated by the plurality of AI-based computer-vision algorithms, wherein each confirmed candidate pavement defect is treated by the system as a pavement defect; measuring each pavement defect; geopositioning each pavement defect by georeferencing its respective set of pixels; and determining the condition measure of the pavement using the measured and geopositioned pavement defects.

22. A system for inspecting and assessing a condition of a pavement of a roadway segment, the system comprises:
    at least one drone that comprises an imaging device configured to capture image data having pixels representing a surface of the pavement, a geopositioning module configured to determine geoposition data of the at least one drone, and one or more sensors configured to acquire operational data of the at least one drone, operational data of the imaging device or environmental data; and
an AI-based computer-vision image processing unit configured to execute a process for detecting, geopositioning and measuring pavement defects from the captured image data, and determining a condition measure of the pavement;
wherein the imaging device, the geopositioning module, and the one or more sensors are configured to operate simultaneously to enable correlation of the image data, the geoposition data of the at least one drone, and one or more of the operational data of the at least one drone, the operational data of the imaging device, and the environmental data, thereby enabling a georeferencing of the pixels within the captured image data; and
wherein the process comprises generating an orthophoto from the captured image data, wherein the orthophoto has georeferenced pixels representing the surface of the pavement; extracting one or more orthophoto portions from the generated orthophoto through a screening process, each orthophoto portion having less than a full spatial extent of the generated orthophoto and comprising one or more sets of georeferenced pixels, each corresponding to a candidate pavement defect; independently processing each orthophoto portion by a plurality of AI-based computer-vision algorithms, wherein each AI-based computer-vision algorithm of the plurality of AI-based computer-vision algorithms treats each orthophoto portion as a separate input and generates a pavement defect detection for each candidate pavement defect; confirming a presence of each candidate pavement defect based on concordant pavement defect detections generated by the plurality of AI-based computer-vision algorithms, wherein each confirmed candidate pavement defect is treated by the system as a pavement defect, which is already geopositioned by its respective set of georeferenced pixels; measuring each pavement defect; and determining the condition measure of the pavement using the measured and geopositioned pavement defects.

23. A method for inspecting and assessing a condition of a pavement of a roadway segment, the method comprises:

flying at least one drone along the roadway segment;

capturing image data having pixels representing a surface of the pavement using the at least one drone; and executing a process for detecting, geopositioning and measuring pavement defects from the captured image data, and determining a condition measure of the pavement;

wherein the process comprises extracting one or more image data portions from the captured image data through a screening process, each image data portion having less than a full spatial extent of the captured image data and comprising one or more sets of pixels, each corresponding to a candidate pavement defect; independently processing each image data portion by a plurality of AI-based computer-vision algorithms, wherein each AI-based computer-vision algorithm of the plurality of AI-based computer-vision algorithms treats each image data portion as a separate input and generates a pavement defect detection for each candidate pavement defect; confirming a presence of each candidate pavement defect based on concordant pavement defect detections generated by the plurality of AI-based computer-vision algorithms, wherein each confirmed candidate pavement defect is treated as a pavement defect; measuring each pavement defect; geopositioning each pavement defect by georeferencing its respective set of pixels based on geoposition data of the at least one drone; and determining the condition measure of the pavement using the measured and geopositioned pavement defects.

24. A method for inspecting and assessing a condition of a pavement of a roadway segment, the method comprises:

flying at least one drone along the roadway segment;

capturing image data having pixels representing a surface of the pavement using the at least one drone; and executing a process for detecting, geopositioning and measuring pavement defects from the captured image data, and determining a condition measure of the pavement;

wherein the process comprises generating an orthophoto from the captured image data using geoposition data of the at least one drone, wherein the orthophoto has georeferenced pixels representing the surface of the pavement; extracting one or more orthophoto portions from the generated orthophoto through a screening process, each orthophoto portion having less than a full spatial extent of the generated orthophoto and comprising one or more sets of georeferenced pixels, each corresponding to a candidate pavement defect; independently processing each orthophoto portion by a plurality of AI-based computer-vision algorithms, wherein each AI-based computer-vision algorithm of the plurality of AI-based computer-vision algorithms treats each orthophoto portion as a separate input and generates a pavement defect detection for each candidate pavement defect; confirming a presence of each candidate pavement defect based on concordant pavement defect detections generated by the plurality of AI-based computer-vision algorithms, wherein each confirmed candidate pavement defect is treated as a pavement defect, which is already geopositioned by its respective set of georeferenced pixels; measuring each pavement defect; and determining the condition measure of the pavement using the measured and geopositioned pavement defects.

* * * * *